(12) United States Patent
Assmann et al.

(10) Patent No.: US 7,863,393 B2
(45) Date of Patent: Jan. 4, 2011

(54) METHOD FOR PRODUCING POLYOXYMETHYLENES

(75) Inventors: Jens Assmann, Mannheim (DE); Knut Zollner, Mannheim (DE); Johannes Heinemann, Brussel (BE); Elmar Stockelmann, Mannheim (DE); Achim Stammer, Freinsheim (DE)

(73) Assignee: BASF AG, Ludwigshafen (DE)

( * ) Notice: Subject to any disclaimer, the term of this patent is extended or adjusted under 35 U.S.C. 154(b) by 447 days.

(21) Appl. No.: 11/720,414

(22) PCT Filed: Nov. 28, 2005

(86) PCT No.: PCT/EP2005/012673

§ 371 (c)(1),
(2), (4) Date: May 29, 2007

(87) PCT Pub. No.: WO2006/058679

PCT Pub. Date: Jun. 8, 2006

(65) Prior Publication Data

US 2008/0167439 A1    Jul. 10, 2008

(30) Foreign Application Priority Data

Nov. 30, 2004   (DE) .................. 10 2004 057 867

(51) Int. Cl.
*C08F 2/00*   (2006.01)

(52) U.S. Cl. .................. 526/64; 528/365; 528/230

(58) Field of Classification Search ................. 528/408, 528/230; 526/64; 422/196, 201, 277
See application file for complete search history.

(56) References Cited

U.S. PATENT DOCUMENTS

| 4,352,923 A |   | 10/1982 | Kono et al. |
|---|---|---|---|
| 4,431,794 A |   | 2/1984 | Sadlowski et al. |
| 5,144,005 A | * | 9/1992 | Sextro et al. ................. 528/480 |
| 5,587,449 A | * | 12/1996 | Fleischer et al. ............. 528/232 |
| 5,608,030 A |   | 3/1997 | Hoffmockel et al. |

FOREIGN PATENT DOCUMENTS

| CA | 2130029 | 2/1995 |
|---|---|---|
| DE | 3703790 | 8/1988 |
| EP | 0028499 | 5/1981 |
| EP | 080656 | 6/1983 |
| EP | 0638357 | 2/1995 |
| EP | 0638599 | 2/1995 |
| WO | 2004065444 | 8/2004 |

* cited by examiner

*Primary Examiner*—Randy Gulakowski
*Assistant Examiner*—Shane Fang
(74) *Attorney, Agent, or Firm*—Connolly Bove Lodge & Hutz LLP

(57) ABSTRACT

Process for preparation of polyoxymethylenes via polymerization of the monomers a) in the presence of cationic initiators b), and also, if appropriate, in the presence of regulators c), and subsequent deactivation and isolation of the polymer, which comprises undertaking the polymerization in a tubular reactor with static mixing elements and with a mixing zone, a polymerization zone, and a deactivation zone, the diameter of the tubular reactor in the mixing zone being <90% of the diameter in the polymerization zone.

18 Claims, No Drawings

METHOD FOR PRODUCING POLYOXYMETHYLENES

CROSS REFERENCE TO RELATED APPLICATIONS

This application is a National Phase of International Application No. PCT/EP2005/012673 filed on Nov. 28, 2005, which claims priority to Application No. 102004057867.2 filed in Germany on Nov. 30, 2004 under 35 U.S.C. §119; the entire contents of all are hereby incorporated by reference.

The invention relates to an improved process for preparation of polyoxymethylenes and to the resultant POM polymers.

Melt polymerization of POM in a tubular reactor is known. By way of example, tubular reactors of various designs are described: firstly with "continuous transition", i.e. geometrically non-distinct mixing zones (EP-A 638 599, EP-A 638 357), and secondly with spatial separation between reaction zone and termination zone (EP-A 80 656). Both methods are approaches intended to achieve adequate mixing of different mass flows or liquids of different viscosity.

A particular problem during melt polymerization is addition of the terminator. This requires effective mixing of very small amounts of a low-molecular-weight component (inorganic salts or organic bases) with the (highly) viscous polymer melt.

The main approach used by the prior art to solve the problem is design of the reactor:
Optimization of residence time in the termination zone (EP-A 638 599, EP-A 638 357)
Incorporation of bottlenecks and variation of flow rate in the reactor (EP-A 80 656).

In the prior art, the form in which the terminators are introduced into the reaction mixture always involves an auxiliary (water, alcohols, or else other solvents), see DE-A 37 03 790, for example.

If the terminator reagents are organic, the result here is a foreign substance in the polymer melt, i.e. new structural units imported into the final product by the terminator. Additional structural units can be introduced if the organic terminator is also present in a solvent. There are associated disadvantages in terms of chain stability and color properties.

If the terminator reagents are inorganic, the amount introduced has ideally been precisely matched to the amount of initiator, because excess base (no vapor pressure) cannot be removed. It is also possible to operate with an excess.

In both instances it is desirable to minimize the amount of the terminator, in order to improve product quality.

It is also desirable to minimize the amount of foreign substances (solvents, low-molecular-weight liquids).

It was therefore an object of the present invention to provide an improved process for preparation of polyoxymethylenes which has the following advantages over the prior art:
optimization of addition and more homogeneous distribution of the terminator in the polymer melt,
improved final product quality,
less involvement of foreign substances in the synthesis,
optimization of residence time in the termination zone of the reactor,
better reproducibility of polymer properties,
a polymer color improved via aliphatic solvents,
higher stability of polymer end groups achieved via aprotic solvents.

Another object was to prepare polyoxymethylene homo- or copolymers which comprise minimum contents of low-molecular-weight POM.

A process found for preparation of polyoxymethylenes via polymerization of the monomers a) in the presence of cationic initiators b), and also, if appropriate, in the presence of regulators c), and subsequent deactivation and isolation of the polymer, accordingly comprises undertaking the polymerization in a tubular reactor with static mixing elements and with a mixing zone, a polymerization zone, and a deactivation zone, the diameter of the tubular reactor in the mixing zone being <90% of the diameter in the polymerization zone.

Preferred embodiments are given in the subclaims.

POM polymers which have asymmetric molar mass distribution have also been found.

The process can, in principle, be carried out in any reactors with a high level of mixing action, examples being trays, plowshare mixers, tubular reactors, List reactors, kneaders, stirred reactors, extruders, and belt reactors.

Examples of suitable reactors are: Kenics (Chemineer Inc.); interfacial surface generator—ISG and low pressure drop mixer (Ross Engineering Inc); SMV, SMX, SMXL, SMR (Sulzer Koch-Glitsch); Inliner series 45 (Lightnin Inc.); CSE mixer (Fluitec Georg AG).

The resultant POM polymers are known to the person skilled in the art and are described in the literature.

Very generally, the main polymer chain of these polymers has at least 50 mol % of —$CH_2O$— repeat units.

The homopolymers are generally prepared via polymerization of monomers a) such as formaldehyde or trioxane, preferably in the presence of suitable catalysts.

For the purposes of the invention, preference is given to polyoxymethylene copolymers, in particular those which have, alongside the —$CH_2O$— repeat units, up to 50 mol %, preferably from 0.01 to 20 mol %, in particular from 0.1 to 10 mol %, and very particularly preferably from 0.5 to 3 mol %, of

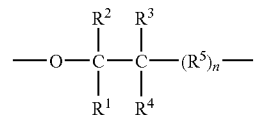

repeat units, where $R^1$ to $R^4$, independently of one another, are a hydrogen atom, a $C_1$-$C_4$-alkyl group, or a halogen-substituted alkyl group having from 1 to 4 carbon atoms, and $R^5$ is a —$CH_2$—, —$CH_2O$—, $C_1$-$C_4$-alkyl-, or $C_1$-$C_4$-haloalkyl-substituted methylene group, or a corresponding oxymethylene group, and n is a value in the range from 0 to 3. These groups may advantageously be introduced into the copolymers via ring-opening of cyclic ethers. Preferred cyclic ethers are those of the formula

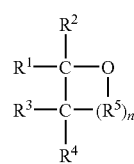

where $R^1$ to $R^5$ and n are as defined above. Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also linear oligo- or polyformals, such as polydioxolane or polydioxepan as comonomers.

Oxymethylene terpolymers are also suitable and, by way of example, are prepared via reaction of trioxane and of one of the cyclic ethers described above with a third monomer, preferably bifunctional compounds of the formula

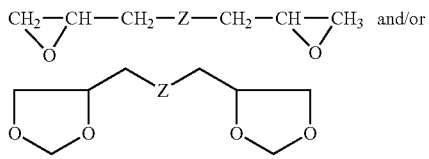

where Z is a chemical bond, —O—, —ORO— (R═$C_1$-$C_8$-alkylene or $C_3$-$C_8$-cycloalkylene).

Preferred monomers of this type are ethylene diglycide, diglycidyl ether and diethers composed of glycidyl systems and formaldehyde, dioxane, or trioxane in a molar ratio of 2:1, and also diethers composed of 2 mol of glycidyl compound and 1 mol of an aliphatic diol having from 2 to 8 carbon atoms, e.g. the diglycidyl ethers of ethylene glycol, 1,4-butanediol, 1,3-butanediol, 1,3-cyclobutanediolt, 1,2-propanediol, and 1,4-cyclohexanediol, to mention just a few examples.

Particular preference is given to end-group-stabilized polyoxymethylene polymers whose chain ends have C—C or —O—$CH_3$ bonds.

The preferred polyoxymethylene copolymers have melting points of at least 150° C., and molecular weights (weight-average) $M_w$ in the range from 5,000 to 300,000, preferably from 7,000 to 250,000.

Particular preference is given to POM copolymers with polydispersity ($M_w/M_n$) of from 2 to 15, preferably from 3 to 12, particularly preferably from 3.5 to 9. The measurements are generally made by way of (GPC) SEC (size exclusion chromatography), the $M_n$ value (number-average molecular weight) generally being determined by means of (GPC) SEC (size exclusion chromatography).

The POM polymers obtainable by the process preferably have monomodal molecular weight distribution, the low-molecular-weight fraction being very small.

In the polyoxymethylene homo- or copolymers, the quotient of the $d_{50}/d_{10}$ values (based on $M_w$) is from 2.25 to 5.5, preferably 2.75 to 5, and in particular from 3.2 to 4.5. The quotient of the $d_{90}/d_{50}$ values (based on $M_w$) is from 1.25 to 3.25, preferably from 1.75 to 2.75, and in particular from 2 to 2.5.

The POM polymers have very small contents of low-molecular-weight fractions, and preferably have an asymmetric, monomodal distribution curve, where the difference between the abovementioned quotients $d_{50}/d_{10}$ with respect to $d_{90}/d_{50}$ is at least 0.25, preferably from 1 to 3, and in particular from 1.0 to 2.3.

Molecular weight determination via GPC (gel permeation chromatography):

Eluent: Hexafluoroisopropanol+0.05% of potassium trifluoroacetate

Column temperature: 40° C.

Flow rate: 0.5 ml/min

Detector: Agilent G1362A differential refractometer.

Narrowly distributed PMMA standards from PSS with molecular weights from M=505 to M=2,740,000 were used for calibration. Elution regions outside this range were estimated via extrapolation.

The person skilled in the art generally understands that the $d_{50}$ value is the value at which 50% of the polymer have smaller $M_w$ and correspondingly 50% have greater $M_w$.

The crude polyoxymethylenes obtainable by the inventive process preferably have residual formaldehyde content to VDA 275 in the pellets of at most 3%, preferably at most 1%, with preference at most 0.05%.

The inventive process is preferably applied to homo- and copolymerization of trioxane. However, the monomer a) used may in principle comprise any of the monomers described above, including, for example, tetroxane or (para)formaldehyde.

The monomers, such as trioxane, are preferably fed as a melt, generally at temperatures of from 60 to 180° C.

The temperature of the reaction mixture during the feed process is preferably from 62 to 170° C., in particular from 120 to 160° C.

If appropriate, the regulators c) conventionally used in (trioxane) polymerization processes may be used to set the molecular weights of the polymer to the desired values. Regulators which may be used are acetals and, respectively, formals of monohydric alcohols, the alcohols themselves, or else the very small amounts of water whose presence cannot generally be completely eliminated and which function as chain transfer agents. The amounts used of the regulators are from 10 to 10,000 ppm, preferably from 50 to 5000 ppm.

The initiators b) used (also termed catalysts) comprise the conventional cationic initiators used in (trioxane) polymerization processes. Proton acids are suitable, for example fluorinated or chlorinated alkyl- and arylsulfonic acids, e.g. perchloric acid, trifluoromethanesulfonic acid, or Lewis acids, e.g. stannic tetrachloride, arsenic pentafluoride, phosphorus pentafluoride, and boron trifluoride, and also their complexes and compounds of salt type, e.g. boron trifluoride etherates and triphenylmethylene hexafluorophosphate. The amounts used of the catalysts (initiators) are from about 0.001 to 1,000 ppm, preferably from 0.01 to 500 ppm, and in particular from 0.05 to 10 ppm. It is generally advisable to add the catalyst in dilute form, preferably at concentrations of from 0.005 to 5% by weight. Solvents which may be used for this purpose are inert compounds, such as aliphatic or cycloaliphatic hydrocarbons, e.g. cyclohexane, halogenated aliphatic hydrocarbons, glycol ethers, etc. Triglyme is particularly preferred as solvent (triethylene glycol dimethyl ether), as also is 1,4-dioxane.

Monomers, and also comonomers a), initiators b), and, if appropriate, regulators c) may be premixed in any desired manner or else added separately to the polymerization reactor. For stabilization, sterically hindered phenols may also be present in components a), b) and/or c), as described in EP-A 129 369 or EP-A 128 739.

In order to minimize content of unstable end groups, it has proven advantageous to dissolve the initiator b) in the regulator c) prior to its addition to the monomer a) and, if appropriate, comonomer a).

It has also been found advantageous to feed the initiator at different points within the tubular reactor. The preferred minimum separation here is 1 D (D=reactor diameter at the given point).

The polymerization process is carried out in a tubular reactor which has a mixing zone, a polymerization zone, and a deactivation zone.

According to the invention, the diameter of the tubular reactor in the mixing zone is <90%, preferably from 10 to 90%, with preference from 10 to 70%, in particular from 10 to 60%, of the diameter of the polymerization zone, specifically based in each case on the largest diameter in the polymerization zone.

In particular, the number of fillets of the static mixing elements in the mixing zone is from 0 to 500%, preferably from 0 to 300%, and in particular from 0 to 100%, higher than in the polymerization zone.

In another embodiment of the inventive process, the mixing zone may have been divided into sections of different diameter. The diameter of the entire mixing zone within the reactor is preferably identical.

The residence time in the mixing zone is preferably from 1 to 300 seconds, in particular from 5 to 60 seconds.

The shear in the mixing zone within the reactor is preferably from 5 to 1000 s$^{-1}$, preferably from 10 to 750 s$^{-1}$, and in particular from 20 to 500 s$^{-1}$.

The method of calculation of shear in the static mixer is:

$$\gamma = \frac{kv}{D}$$

γ: Shear [s$^{-1}$]

k: Manufacturer's constant for the static mixer

The viscosity is preferably from 0.1 mPas to 100 Pas, preferably from 0.1 mPas to 10 Pas.

The method of calculation of viscosity is:

$$\eta = \frac{\Delta p D^2}{NeReLv}$$

η: Viscosity

Δp: Pressure drop across the mixing element

D: Diameter of static mixer

NeRe: Property of static mixer—Newton-Reynolds number

L: Length of static mixer

V: Flow rate within mixer

The residence time for the polymerization process is preferably from 0.1 to 40 min, in particular from 1 to 20 min. The polymerization process is preferably conducted to conversion of at least 30%, in particular more than 60%.

A procedure which has generally proven successful sets a pressure of from 5 to 200 bar abs, preferably from 10 to 100 bar abs, during the polymerization process.

In another embodiment of the inventive process, the polymerization zone may have been divided into sections of different diameter, in particular from 2 to 10 sections, preferably from 2 to 5 sections. The relationship between the smallest diameter and the largest diameter is preferably from 20 to 100%, in particular from 30 to 90%, and particularly preferably from 45 to 75%.

The shear in the polymerization zone is preferably from 1 to 300 s$^{-1}$, preferably from 2 to 100 s$^{-1}$, and in particular from 3 to 50 s$^{-1}$. The viscosity is preferably from 1 to 1000 Pas, preferably from 10 to 500 Pas, and in particular from 100 to 400 Pas.

According to the invention, the polymerization mixture is deactivated directly after the polymerization process, preferably without any phase change.

The general method of deactivation of the catalyst residues is addition of at least one deactivator d).

Examples of suitable deactivators are ammonia, aliphatic and aromatic amines, salts having basic reaction, e.g. soda and borax. The amounts of these usually added to the polymers are preferably up to 1% by weight.

Among the organic compounds of the alkaline earth metals or of the alkali metals, preferably of sodium, are the corresponding salts of (cyclo)aliphatic, araliphatic, or aromatic carboxylic acids, preferably having up to 30 carbon atoms and preferably having from 1 to 4 carboxy groups. Examples of these are: alkali metal salts of formic acid, acetic acid, propionic acid, butyric acid, isobutyric acid, caprylic acid, stearic acid, cyclohexanecarboxylic acid, succinic acid, adipic acid, suberic acid, 1,10-decane-dicarboxylic acid, 1,4-cyclohexanedicarboxylic acid, terephthalic acid, 1,2,3-propane-tricarboxylic acid, 1,3,5-cyclohexanetricarboxylic acid, trimellitic acid, 1,2,3,4-cyclo-pentanetetracarboxylic acid, pyromellitic acid, benzoic acid, substituted benzoic acids, dimer acids, and trimer acid, and also neutral and semineutral montan wax salts, or montan wax ester salts (montanates). The invention can also use salts having other types of acid radicals, e.g. alkalki metal paraffin-, alkali metal olefin-, and alkali metal arylsulfonates, or else phenolates, or else alcoholates, e.g. methanolates, ethanolates, glycolates.

It is preferable to use sodium salts of mono- and polycarboxylic acids, in particular those of aliphatic mono- and polycarboxylic acids, preferably those having from 2 to 18 carbon atoms, in particular having from 2 to 6 carbon atoms, and having up to 4, preferably up to 2, carboxy groups, or else sodium alcoholates, preferably having from 2 to 15, in particular from 2 to 8, carbon atoms. Examples of particularly preferred representatives are sodium acetate, sodium propionate, sodium butyrate, sodium oxalate, sodium malonate, sodium succinate, sodium methanolate, sodium ethanolate, sodium glyconate. Very particular preference is given to sodium methanolate, the amount used being particularly advantageously from 1 to 5 molar equivalents of the component b) used. It is also possible to use mixtures of various alkali metal compounds or alkaline earth metal compounds, and hydroxides may also be used.

Other preferred deactivators d) are alkaline earth metal alkyl compounds which have from 2 to 30 carbon atoms in the alkyl radical. Particularly preferred metals which may be mentioned are Li, Mg, and Na, and particular preference is given here to n-butyllithium.

Preferred deactivators d) are those of the formula I

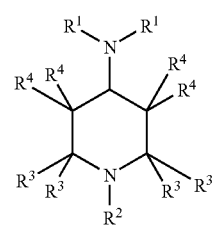

where R$^1$, R$^3$, R$^4$, and R$^5$, independently of one another, are hydrogen or a C$_1$-C$_{10}$-alkyl group, and R$^2$ is hydrogen or a C$_1$-C$_{10}$-alkyl group, or O—R$^5$.

Preferred radicals R$^1$ to R$^5$ are, independently of one another, hydrogen or a C$_1$-C$_4$-alkyl group, such as methyl, ethyl, n-propyl, isopropyl, n-butyl, isobutyl, sec-butyl, tert-butyl.

Particularly preferred deactivators d) are substituted N-containing heterocycles, in particular derivatives of piperidine, particular preference being given to triacetonediamine (4-amino-2,2,6,6-tetramethylpiperidine).

The amounts fed of the deactivator, based on the throughput of trioxane, are from 0.001 to 25 ppm, preferably from 0.01 to 5 ppm, in particular from 0.05 to 2 ppm. The deactivator is preferably in dilute form in one of the carrier/solvents mentioned below. The concentration of deactivator in the carrier/solvent is from 0.001 to 10%, preferably from 0.01 to 5%, in particular from 0.05 to 2%, and very particularly preferably from 0.1 to 1%.

According to the invention, the diameter of the tubular reactor in the deactivation zone is <95%, preferably from 20 to 95%, in particular from 30 to 90%, and particularly preferably from 50 to 85% of the diameter in the polymerization zone.

In particular, the number of fillets of the static mixing elements in the deactivation zone is from 0 to 500%, preferably from 50 to 300%, and in particular from 50 to 200%, higher than in the polymerization zone.

In another embodiment of the inventive process, the deactivation zone may have been divided into sections of different diameter, in particular from 1 to 5 sections, preferably 2 sections. The diameter of the smallest section here is from 20 to 100%, preferably from 30 to 90%, of the diameter of the largest section, and in particular from 50 to 90%.

In the particularly preferred embodiments of the deactivation zone in 2 sections, the 1st section comprises a number of fillets which is higher by from 20 to 500%, preferably from 50 to 300%, and in particular from 50 to 200%, than in the polymerization zone, and the 2nd section comprises a number of fillets which is higher by from −100 to 500%, or from −100 to 300%, and preferably from −100 to 200%, than in the polymerization zone.

The shear in the deactivation zone is preferably from 0.1 to 500 $s^{-1}$, preferably from 1 to 100 $s^{-1}$, and in particular from 3 to 75 $s^{-1}$. In the case of the preferred embodiment in a plurality of sections (from 1 to 5, preferably 2), the shear in the section with the smallest diameter, preferably the 1st section following the polymerization zone, is from 10 to 200 $s^{-1}$, preferably from 15 to 100 $s^{-1}$, and particularly preferably from 20 to 75 $s^{-1}$. In the following sections the above values apply.

The viscosity is preferably from 1 to 1000 Pas, preferably from 100 to 800 Pas, and in particular from 150 to 600 Pas.

The residence time in the deactivation zone is preferably from 0.5 to 20 min, in particular from 1 to 10 min.

The deactivator d) is preferably added in an aprotic, non-aromatic solvent, for example in the abovementioned monomers and comonomers, such as dioxolane, trioxane, butanediol formal, ethylene oxide, or oligomeric to polymeric polyacetals.

In one particularly preferred embodiment of the inventive process, the deactivator d) is present in a carrier substance having ether structural units when it is added to the polymerization mixture.

Preferred suitable carrier substances are those in which the structural units present are the same as those present in the respective POM polymer to be prepared. Among these compounds are in particular the monomers a) listed above, and also oligomeric to polymeric polyoxymethylene or polyacetals.

The preferably liquid addition is carried out at temperatures of from 140 to 220° C.

If the carrier substances used comprise oligomeric or polymeric POM polymers, preference is likewise given to addition in liquid form at temperatures of from 160 to 220° C. Polymers of this type may, if appropriate, comprise conventional additives. For feed of these melts of the carrier substances which comprise the deactivators d) it is preferable to use apparatus such as ancillary extruders, stuffing screws, melt pumps, etc.

The resultant polymer is then generally transferred to a devolatilizer.

The corresponding polyoxymethylene polymer can then be further processed in a conventional manner with conventional additives, such as stabilizers, rubbers, fillers, etc.

The inventive procedure can give better feed and incorporation of the terminator (deactivator).

The POM obtainable by the inventive process has quality advantages, such as improved thermal stability, color, less chain degradation, and good flowability and mechanical properties.

The inventive procedure also permits preparation of polyacetals with multimodal, preferably bimodal, molecular weight distributions. For this purpose, the stream of, by way of example, trioxane is polymerized in parallel tubular reactors (at least 2), giving fractions of different molecular weight, which are then mixed. One, or a combination of, parameter(s) can be used to prepare the desired polymer in the separate streams, and this is then in turn mixed, upstream or downstream of the mixing zone, with the terminator, downstream of the deactivation zone, or in the devolatilization step, or in the extruder. It is also possible to mix substreams at the points mentioned.

INVENTIVE EXAMPLE

A mixture composed of 96.495% by weight of liquid trioxane, 3.5% by weight of dioxolane and 0.005% by weight of methylal was heated to 160° C. and pumped into a tubular reactor with static mixers (4-fillet and 8-fillet systems).

The tubular reactor was composed of a reaction zone and of a termination zone. The reaction zone was in turn composed of 3 subsections with different diameters (1st reactor section 12 mm, 2nd reactor section 15 mm, 3rd reactor section 27 mm). The termination zone was composed of 2 subsections with different diameter (1st reactor section 8-fillet system 17 mm, 2nd reactor section 4-fillet system 27 mm).

The pipeline between reactor and devolatilization stage likewise functioned as termination zone.

The polymerization reaction was initiated via addition of X ppm of perchloric acid (in the form of 0.01% strength by weight solution in 1,4-dioxane), the pressure at the outlet of the reactor being adjusted by way of a control valve and amounting to 20 bar. The temperature in the reaction zone (165° C.) and in the termination zone (195° C.) is controlled by way of a jacket.

After a residence time of 2 min, triacetonediamine was metered into the termination zone of the reactor as terminator (in the form of 0.1% strength by weight solution in 1,3-dioxolane) and incorporated by mixing by way of a static mixer in such a way that the molar amount of terminator present was 10 times that of the perchloric acid.

After a further residence time of 3 min, the product (crude POM) was depressurized to a pressure of 3 bar by way of a control valve into a devolatilization vessel, and the volatile components were thus removed from the polymer melt. Residues of trioxane and formaldehyde remained in the polymer melt.

The product was discharged and subjected to GPC.

COMPARATIVE EXAMPLE 2, 3

A mixture composed of 96.495% by weight of liquid trioxane, 3.5% by weight of dioxolane and 0.005% by weight of methylal was heated to 160° C. and pumped into a tubular reactor with static mixers.

The tubular reactor was composed of a smooth tube equipped with feed devices for the initiator and the terminator. The feed devices had been attached at an angle of 60° to the direction of flow. The diameter of the tube is 12 mm. Static mixing elements had been attached for mixing to incorporate the initiator and the terminator. The temperature in the reactor is controlled in the reaction zone (165° C.) and in the termination zone (195° C.) by way of a jacket.

The polymerization reaction was initiated via addition of X ppmw of perchloric acid (in the form of 0.01% strength by weight solution in 1,4-dioxane), and the pressure in the reactor was P bar.

After a residence time of 2 min, triacetonediamine was metered into the termination zone of the reactor as terminator (in the form of 0.1% strength by weight solution in 1,3-dioxolane) and incorporated by mixing by way of a static mixer in such a way that the molar amount of terminator present was 10 times that of the perchloric acid.

After a further residence time of 3 min, the product (crude POM) was depressurized to a pressure of 3 bar by way of a control valve into a devolatilization vessel, and the volatile components were thus removed from the polymer melt. Residues of trioxane and formaldehyde remained in the polymer melt.

The product was discharged and subjected to GPC.

|  | Inventive example | Comparative example 1 | Comparative example 2 |
| --- | --- | --- | --- |
| X (=molar amount of perchloric acid) | 0.05 ppmw | 0.05 ppmw | 1 ppmw |
| P (=pressure in tubular reactor) | 20 bar | (no reaction) | 15 bar |
| Mn/Mw | 26 000/130 000 | — | 12 000/48 700 |

Using an amount of initiator of 0.05 ppmw, a polymerization reaction took place only in the inventive reactor, and in comparative example 1 only clouding of the trioxane was observed. An increase in the initiator concentration in the comparative example by a factor of 20 led to the polymerization reaction, but only low-molecular-weight product is obtained.

In contrast, the inventive tubular reactor permits preparation of high-molar-mass polyacetals using extremely small amounts of initiator.

The invention claimed is:

1. A process for preparation of polyoxymethylenes via polymerization of the monomers a) in the presence of cationic initiators b), and also, if appropriate, in the presence of regulators c), and subsequent deactivation and isolation of the polymer, which comprises undertaking the polymerization in a tubular reactor with static mixing elements and with a mixing zone, a polymerization zone, and a deactivation zone, the entire diameter of the tubular reactor in the mixing zone being <90% of the entire diameter in the polymerization zone and the entire diameter of the deactivation zone of the reactor being <95% of the entire diameter of the polymerization zone.

2. The process according to claim 1, wherein the deactivation zone comprises from 1 to 5 sections.

3. The process according to claim 1, wherein the entire diameter of the smallest section in the deactivation zone is from 30 to 95% of the entire diameter of the largest section.

4. The process according to claim 1, wherein a number of fillets in the static mixing elements in the mixing zone is from 0 to 500% higher than in the polymerization zone.

5. The process according to claim 1, wherein a number of fillets in the static mixing elements in the deactivation zone is from 20 to 500% higher than in the polymerization zone.

6. The process according to claim 1, wherein the deactivator is added in an aprotic, non-aromatic solvent.

7. The process according to claim 1, wherein the deactivator d) is present in a carrier substance having ether structural units when it is added to the polymerization mixture.

8. The process according to claim 7, wherein structural units present in the carrier are the same as those comprised in the polyoxymethylene polymer prepared.

9. The process according to claim 7, wherein the carrier substance used comprises an oligomeric or polymeric polyoxymethylene.

10. The process according to claim 1, wherein the amounts added of the deactivator, based on the throughput of trioxane, are from 0.001 to 25 ppm.

11. The process according to claim 2, wherein a entire diameter of the smallest section in the deactivation zone is from 30 to 95% of the entire diameter of the largest section.

12. The process according to claim 2, wherein a number of fillets in the static mixing elements in the mixing zone is from 0 to 500% higher than in the polymerization zone.

13. The process according to claim 3, wherein a number of fillets in the static mixing elements in the mixing zone is from 0 to 500% higher than in the polymerization zone.

14. The process according to claim 2, wherein a number of fillets in the static mixing elements in the deactivation zone is from 20 to 500% higher than in the polymerization zone.

15. The process according to claim 3, wherein a number of fillets in the static mixing elements in the deactivation zone is from 20 to 500% higher than in the polymerization zone.

16. The process according to claim 4, wherein a number of fillets in the static mixing elements in the deactivation zone is from 20 to 500% higher than in the polymerization zone.

17. A process for preparation of polyoxymethylenes via polymerization of the monomers a) in the presence of cationic initiators b), and also, if appropriate, in the presence of regulators c), and subsequent deactivation and isolation of the polymer, which comprises undertaking the polymerization in a tubular reactor with static mixing elements and with a mixing zone, a polymerization zone, and a deactivation zone, the entire diameter of the tubular reactor in the mixing zone being <90% of the entire diameter in the polymerization zone and the entire diameter of the deactivation zone of the reactor being <95% of the entire diameter of the polymerization zone, wherein the deactivation zone comprises from 1 to 5 sections; wherein the entire diameter of the smallest section in the deactivation zone is from 30 to 95% of the entire diameter of the largest section and wherein a number of fillets in the static mixing elements in the deactivation zone is from 20 to 500% higher than in the polymerization zone.

18. The process according to claim 17, wherein the amounts added of the deactivator, based on the throughput of trioxane, are from 0.001 to 25 ppm.

* * * * *